No. 851,662. PATENTED APR. 30, 1907.
R. P. JACKSON.
CONTROLLING APPARATUS FOR ELECTRIC MOTORS.
APPLICATION FILED MAR. 17, 1905.
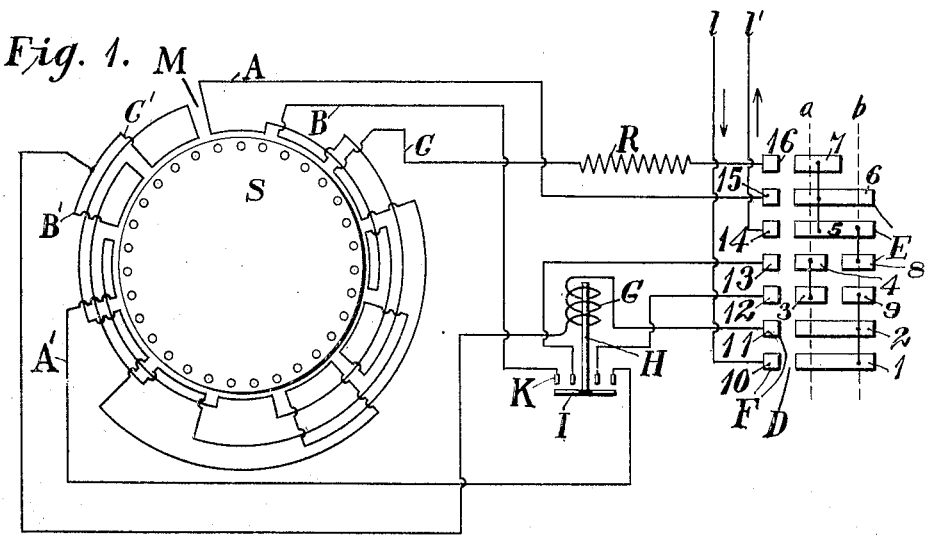
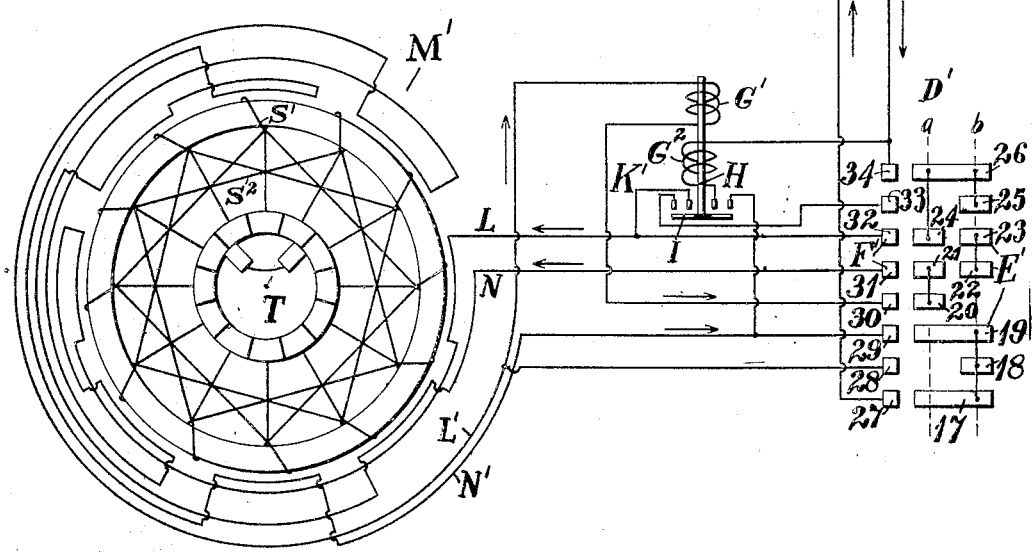
WITNESSES:
Fred. H. Miller
R. J. Dearborn
INVENTOR
Ray P. Jackson
BY
Wesley L. Carr
ATTORNEY

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROLLING APPARATUS FOR ELECTRIC MOTORS.

No. 851,662.      Specification of Letters Patent.      Patented April 30, 1907.

Application filed March 17, 1905. Serial No. 250,646.

*To all whom it may concern:*

Be it known that I, RAY P. JACKSON, a citizen of the United States, and a resident of Wilkinsburg, in the county of Allegheny and State of Pennsylvania, have invented a new and useful Improvement in Controlling Apparatus for Electric Motors, of which the following is a specification.

My invention relates to alternating current electrical apparatus, and it has particular reference to means for governing and controlling the operation of motors.

The object of my invention is to provide controlling and governing means for alternating current motors, which shall embody a simple, reliable and automatic safety device for preventing the transmission of current to the windings of such motors, after the supply of current has been once cut off, unless and until the controller is returned to its initial or starting position.

I have shown my invention as applied to an induction motor the primary member of which is provided with two main windings and with an auxiliary winding, the former of which are connected in series with each other and in parallel with the auxiliary winding for the purpose of starting the motor and bringing it up to normal operating speed, the main windings being connected in parallel and the auxiliary winding cut out of circuit when the motor attains normal operating speed. I have shown my invention as also applied to a motor the primary member of which is provided with a plurality of windings that are so connected in series as to provide one number of poles for starting and in parallel to provide a smaller number of poles for operating at normal speed, the windings of the secondary member being connected to a commutator so constructed and arranged that the motor may start as a repulsion motor and may operate at normal speed as an induction motor. These two applications of my invention are presented as indicative of its practical possibilities and not as limiting it to any specific type or types of motors.

In any type or kind of motor having a plurality of windings that are connected in series for starting and in parallel for normal operation, if the supply of energy is cut off when the controller is in its running position, so that the motor comes to rest or drops below the speed at which current in the main windings will maintain it in operation, it is important that the controller should be returned to its initial or starting position before current is again supplied to the windings of the motor, in order that destruction or serious damage to such windings may be avoided.

My present invention is designed to prevent the transmission of energy from the supply circuit to the primary windings connected for normal speed operation unless the motor is actually operating substantially at normal speed.

In the accompanying drawing, Figure 1 is a diagrammatic view of an induction motor, a controller and a governing device therefor, and Fig. 2 is a similar view of a motor which is designed to start as a repulsion motor and to operate normally as an induction motor and controlling and governing devices similar to those shown in Fig. 1.

Referring first to Fig. 1, the windings of the motor M are designated by reference to their terminals, one of the main windings being designated as A A', the other winding being designated as B B' and the auxiliary winding as C C'. In order that the current in the auxiliary winding C C' may be displaced in phase from that in the main windings, the winding is either made of comparatively high resistance or an external resistance R is included in circuit with it, as indicated. The secondary or rotary member S of the motor may be of the ordinary squirrel cage construction, or it may be of any other suitable construction adapted to the purpose.

The controller D, which is utilized in connection with the motor M, comprises a drum, here represented by a set of contact strips or segments E, which are severally designated as 1, 2, 3, 4, 5, 6, 7, 8 and 9, and a set of stationary contact fingers F which respectively engage with the contact strips or segments as the drum is rotated and are severally designated as 10, 11, 12, 13, 14, 15 and 16.

In position *a* of the drum, which is the starting position, current is supplied from a suitable source through the supply conductor *l*, the finger 10, the drum strips or segments *l* and 2, the finger 11, and the electromagnet or solenoid G, to the terminals B' and C' of the corresponding main and auxiliary motor windings, and since the finger 16 is in contact with the corresponding drum segment 7, the circuit through the auxiliary winding to the line conductor $l'$ is completed. The magnet or solenoid G is therefore energized and attracts its armature or core H, to the lower end of which is attached the movable member I of a double switch K. This serves, in conjunction with the controller fingers and drum segments, to connect the main windings of the motor in series with each other and in parallel with the auxiliary winding C C', the circuit being from conductor $l$ through finger 10, segments 1 and 2, solenoid G, winding B' B, the left side of switch K, finger 13, segments 4 and 3, finger 12, the right side of switch K, winding A' A, finger 15, segments 6 and 5, and finger 14 to conductor $l'$. When the motor has reached approximately synchronous speed, the controller is turned to position $v$ and in this position the drum segment or strip 7 is moved out of contact with finger 16 and consequently the auxiliary winding is out of circuit and the other circuits or segments are so connected as to connect the main windings in parallel with each other, one circuit being from conductor $l$ through finger 10, segments 1 and 2, solenoid G, winding B' B, left end of switch K, finger 13, segments 8 and 5, and finger 14 to conductor $l'$ and the other being from conductor $l$ through finger 10, segments 1 and 9, finger 12, right side of switch K, winding A' A, finger 15, segments 6 and 5, and finger 14 to conductor $l'$. If the supply of current to the controller is interrupted, the solenoid or magnet G will obviously be deënergized and will drop its armature or core H and thus open the switch K; and since the circuits of the main windings are thus opened, the magnet cannot be again energized, except by means of the circuit through the auxiliary winding, and as that circuit is open in position $v$, current cannot be again supplied to the motor except by returning the drum to its initial or $a$ position.

Referring now to Fig. 2, the motor M' is provided with a primary winding which is divided into two parts that may be connected in series to form one number of poles for starting purposes and in parallel to produce a smaller number of poles for normal operation by means of a controller D'. Points in the winding of the armature S' which are normally equal in potential when the primary winding of the motor is connected for the larger number of poles may be connected, by means of cross-connectors $S^2$, and the armature winding is also suitably connected to a commutator T, the brushes of which may be controlled, in a well known manner, to raise them from the commutator cylinder when a predetermined speed of rotation is reached.

Inasmuch as my invention is not limited to any specific type or kind of alternating current motor and the type here shown is known in the art, I deem it unnecessary to enter more fully into a description of its structure or mode of operation.

Referring particularly to the operation of the governing and controlling device, when the drum E' of the controller D' is in position $a$, which is the starting position, current is supplied from a suitable source, through the supply conductor $l$, the finger 34, the drum segments 26 and 24, finger 32, that portion of the winding of the motor which is represented by the terminals L and L', coil G' of switch K', drum finger 30, segment 20, segment 21, finger 31, the portion of the motor winding represented by the terminals N N', drum finger 29, segments 19 and 17, finger 27 and supply conductor $l'$. The passage of current through the coil G' serves to lift the movable member I of the switch K' and thus completes a high resistance circuit from the supply conductor $l$, through the holding coil $G^2$ of the switch K', the contact terminals of the switch, finger 29, contact segments 19 and 17 and finger 27, to the supply conductor $l'$. When the motor has attained substantially normal operating speed, the drum E' of the controller D' will be turned to position $b$, and in this position the motor circuit will be from the supply conductor $l$, through finger 34, segments 26 and 25, finger 33, the contact terminals at one side of the switch K', winding corresponding to terminals L L', finger 28, contact segments 18 and 17 and finger 27, to the supply conductor L', and also in parallel circuit from the switch K', through finger 32, segments 23 and 22, finger 31, winding corresponding to terminals N N', finger 29, segments 19 and 17 and finger 27, to the supply conductor L'. So long as the supply of energy is maintained and the controller remains in position $b$, the parts will maintain the positions just indicated. In case the supply fails, however, the switch K' will automatically open and, as will readily be seen, the motor circuit cannot be again closed until the drum E' is returned to position $a$, in which position the windings corresponding to the terminals L L' and N N' are connected in series and therefore the energy from the supply circuit may be safely applied thereto.

I claim as my invention:

1. The combination with an induction motor having two main windings and an auxiliary winding, of a controller comprising means for connecting the main windings in series for starting and in parallel for running and automatic means for opening the circuits of the main windings when the working current is cut off and for maintaining such open circuit condition until the main windings are again connected in series.

2. The combination with an induction motor having one or more main windings and an auxiliary winding, of a controller operating to connect the main and the auxiliary windings in circuit with a source of energy for starting purposes and to cut the auxiliary winding out of circuit for normal operation, and embodying automatic means for opening the main winding circuit when the working current is cut off and for maintaining such open-circuit condition until the controller is returned to the initial or starting position.

3. The combination with an induction motor having two main windings and an auxiliary winding, of a controller comprising means for connecting the main winding in series for starting and in parallel for normal operation and for cutting the auxiliary winding out of circuit when in normal-operating position, a switch in the main winding circuits and an operating magnet therefor that can be initially energized only when the controller is in the initial or starting position.

4. The combination with an induction motor having two main windings and an auxiliary winding, of a controller having means for connecting the main windings in series with each other and in parallel with the auxiliary winding for starting and in parallel with each other for normal operation, and automatic means for opening the circuits of the main windings when the working current fails and for maintaining such open-circuit condition until the controller is returned to its initial or starting position.

5. The combination with an induction motor having two main windings and an auxiliary winding, of a controller comprising means for connecting the main windings in series with each other and in parallel with the auxiliary winding when in its initial or starting position and for cutting the auxiliary winding out of circuit and connecting the main windings in parallel when in its normal operating position, and automatic means for opening the circuits of the main windings if the working current is interrupted when the controller is in its normal operating position and for maintaining such open-circuit condition until it is again returned to its initial or starting position.

6. The combination with an induction motor having main and auxiliary windings, of a controller comprising means for connecting both windings in circuit for starting and for cutting the auxiliary winding out of circuit for running, a switch in the main winding circuit and an operating magnet that can be initially energized only when the auxiliary circuit is closed.

7. The combination with an induction motor having two main windings and an auxiliary winding, of a controller comprising means for connecting the main windings in series with each other and in parallel with the auxiliary winding for starting and in parallel without the auxiliary winding for normal operation, a switch for opening and closing the main windings and an operating magnet that can be initially energized only when the auxiliary winding is in circuit.

8. The combination with an induction motor having two main windings and an auxiliary winding, of a controller comprising means for connecting the main windings in series with each other and in parallel with the auxiliary winding when in its first position and for connecting the main windings in parallel without the auxiliary winding when in its second position, a switch for opening and closing the main winding circuits and an operating magnet that can be initially energized only when the controller is in its first position.

9. The combination, in an electric motor, of a primary member having one or more main windings and an auxiliary winding, a controller operating to connect the main and the auxiliary windings in circuit with a source of energy for starting purposes and to cut the auxiliary winding out of circuit for normal operation, and embodying means for opening the main winding circuit when the working current is cut off and for maintaining such open-circuit condition until the starting relations of the windings are reëstablished.

10. In an alternating current electric motor, the combination with a primary member having a plurality of windings, and a controller for connecting said windings to the supply circuit in one way for starting and in another way for normal operation and a governing switch having an actuating winding the circuit of which cannot be closed unless the controller is in starting position.

11. In an alternating current electric motor, the combination with a primary member having windings and a controller for connecting said windings to a supply circuit and for changing their connections to adapt them to starting conditions and to running conditions, and a governing switch that opens the motor circuit when the power current fails, said switch having an actuating coil the circuit of which can be closed only when the controller is in its starting position.

12. The combination, in an electric motor, of a primary member having a plurality of main windings, a controller comprising means for connecting the said main windings in series for starting and in parallel for running and an automatic switch for opening the circuits of the main windings when the working current is cut off, said switch having an actuating coil the circuit of which closes only when the main windings are connected in series.

13. The combination, in an electric motor, of a primary member having one or more main windings and an auxiliary winding, a controller operating to connect the main and the auxiliary windings in circuit with a source of energy for starting purposes and to cut the auxiliary winding out of the circuit for normal operation, and embodying means for opening the main winding circuit when the working current is cut off and for maintaining such open-circuit condition until the controller is returned to the initial or starting position.

14. The combination, in an electric motor, of a primary member having a plurality of main windings, a controller having means for connecting the main windings in series with each other for starting and in parallel with each other for normal operation, and an automatic switch for opening the circuits of the main windings when the working current fails, said switch having an actuating winding the circuit of which is opened when the current fails and can be again closed only by moving the controller to its initial or starting position.

15. The combination, in an electric motor, of a primary member having two main windings and an auxiliary winding, a controller comprising means for connecting the main windings in series with each other and in parallel with the auxiliary winding when in its initial or starting position and for cutting the auxiliary winding out of circuit and connecting the main windings in parallel when in its normal operating position, and means for opening the circuits of the main windings if the working current is interrupted when the controller is in its normal operating position and for maintaining such open-circuit condition until it is again returned to its initial or starting position.

16. The combination, in an electric motor, of a primary member having main and auxiliary windings, a controller comprising means for connecting both windings in circuit for starting and for cutting the auxiliary winding out of circuit for running, a switch in the main winding circuit and an operating magnet that can be initially energized only when the auxiliary circuit is closed.

17. The combination, in an electric motor, of a primary member having two main windings and an auxiliary winding, a controller comprising means for connecting the main windings in series with each other and in parallel with the auxiliary winding for starting and in parallel without the auxiliary winding for normal operation, a switch for opening and closing the main windings and an operating magnet that can be initially energized only when the auxiliary winding is in circuit.

18. The combination with an electric motor having a plurality of magnetizing windings, of a controller for connecting the said windings to the supply circuit in one way for starting and in another for normal operation, and a governing switch that opens the motor circuit if the operating current fails and is provided with an actuating coil the circuit of which closes only when the controller is in starting position.

19. The combination with an electric motor having a plurality of magnetizing windings, of a controller for connecting said windings to a supply circuit and for changing their relations to adapt them to starting conditions and to running conditions, and a governing switch that cuts off said windings from the supply circuit when the current fails and is provided with an actuating coil the circuit of which remains open until the controller is moved to starting position.

20. The combination with an electric motor having one magnetizing circuit condition for starting and a different magnetizing circuit condition for normal operation, of a controller having means for establishing a proper connection to a supply circuit and the desired motor circuit condition, and an automatic switch for breaking connection to the supply circuit when the working current fails, said switch having an actuating winding the circuit of which remains open until the controller is returned to its initial or starting position.

In testimony whereof, I have hereunto subscribed my name this 11th day of March, 1905.

RAY P. JACKSON.

Witnesses:
RAYNAR WIKANDER,
BIRNEY HINES.